(12) United States Patent
Weinblatt

(10) Patent No.: US 9,554,092 B2
(45) Date of Patent: Jan. 24, 2017

(54) SYSTEM AND METHOD FOR PROVIDING INCENTIVE REWARDS TO AN AUDIENCE TUNED TO A BROADCAST SIGNAL

(75) Inventor: Lee S. Weinblatt, Teaneck, NJ (US)

(73) Assignee: Winmore, Inc., Tenafly, NJ (US)

( * ) Notice: Subject to any disclaimer, the term of this patent is extended or adjusted under 35 U.S.C. 154(b) by 434 days.

(21) Appl. No.: 11/799,244

(22) Filed: Apr. 30, 2007

(65) Prior Publication Data
US 2007/0288952 A1 Dec. 13, 2007

Related U.S. Application Data

(60) Provisional application No. 60/799,575, filed on May 10, 2006.

(51) Int. Cl.
H04H 20/71 (2008.01)
H04H 60/09 (2008.01)
(Continued)

(52) U.S. Cl.
CPC .......... *H04N 7/173* (2013.01); *H04N 21/2407* (2013.01); *H04N 21/4784* (2013.01); *H04N 21/812* (2013.01)

(58) Field of Classification Search
CPC . H04B 7/18523; H04B 7/18556; G06Q 30/02; G06Q 30/0208; G06Q 30/0217; G06Q 30/0218; G06Q 30/0226; G06Q 30/0235; G06Q 30/0241; G06Q 30/0267; G06Q 30/0264; G06Q 30/0269; G06Q 30/0272; G06Q 30/06; G06Q 20/1235; G06Q 20/342; H04N 21/252; H04N 21/4532; H04N 21/25891; H04N 21/4325; H04N 21/4334; H04N 21/4383; H04N 21/44008; H04N 21/441; H04N 21/44222; H04N 21/4755; H04N 5/44582; H04N 7/0887; H04N 7/17309; H04N 7/173; H04N 19/00945; H04N 21/43; H04N 21/44; H04N 21/45; H04N 21/47; H04H 20/02; H04H 20/10; H04H 20/28; H04H 20/40; H04H 20/74; H04H 20/90; H04H 60/14; H04H 60/27; H04H 60/33; H04H 60/37; H04H 60/40; H04H 60/43; H04H 60/46; H04H 60/51; H04H 60/64; H04H 2201/30; H04H 40/90
(Continued)

(56) References Cited

U.S. PATENT DOCUMENTS 5,303,393 A * 4/1994 Noreen et al. ............... 455/3.02
5,455,823 A * 10/1995 Noreen et al. ............... 370/312
(Continued)

FOREIGN PATENT DOCUMENTS

WO   WO 2005/041455 A1   5/2005

*Primary Examiner* — Yuwen Pan
*Assistant Examiner* — Paul P Tran
(74) *Attorney, Agent, or Firm* — Cozen O'Connor

(57) ABSTRACT

A technique for offering a reward to an audience member tuned to a broadcast signal which is performed by reproduction equipment, the broadcast signal having commercial content, program content, and commercial content identification codes respectively corresponding to advertisements contained in the commercial content, wherein the audience member captures the commercial content identification codes from the performed broadcast signal and actuates storing of a segment of a program content from the performed broadcast signal. The technique identifies the program based on the segment thereof that was stored in response to the command, and offers the audience member a reward related to the identified program.

49 Claims, 2 Drawing Sheets

(51) Int. Cl.

| | | |
|---|---|---|
| *H04B 7/185* | (2006.01) | |
| *H04B 7/14* | (2006.01) | |
| *H04J 1/10* | (2006.01) | |
| *H04J 3/08* | (2006.01) | |
| *H04W 4/00* | (2009.01) | |
| *H04N 9/80* | (2006.01) | |
| *G06Q 30/00* | (2012.01) | |
| *G06F 15/16* | (2006.01) | |
| *H04N 7/16* | (2011.01) | |
| *G06F 3/00* | (2006.01) | |
| *G06F 13/00* | (2006.01) | |
| *H04N 5/445* | (2011.01) | |
| *H04N 7/173* | (2011.01) | |
| *H04N 21/24* | (2011.01) | |
| *H04N 21/4784* | (2011.01) | |
| *H04N 21/81* | (2011.01) | |

(58) Field of Classification Search
USPC ... 455/3.01–3.06, 45, 66.1, 2.01, 12.1, 13.1, 455/13.2, 13.3, 13.4, 63.1, 414.1, 419, 455/427, 456.1; 705/14.1, 14.26, 14.27, 705/14.47, 14.51, 14.64, 14.69; 725/13, 725/14, 23, 27, 34, 46, 47, 116, 139; 709/203, 204, 219, 228, 246, 247, 248; 386/46, 125, 250
See application file for complete search history.

(56) References Cited

U.S. PATENT DOCUMENTS

| | | | | |
|---|---|---|---|---|
| 6,446,130 | B1 * | 9/2002 | Grapes | 709/231 |
| 6,766,524 | B1 * | 7/2004 | Matheny et al. | 725/23 |
| 6,785,656 | B2 * | 8/2004 | Patsiokas et al. | 704/500 |
| 6,975,835 | B1 * | 12/2005 | Lake et al. | 455/3.01 |
| 7,159,233 | B2 * | 1/2007 | Son | H04L 12/2801 348/E5.008 |
| 7,171,480 | B2 * | 1/2007 | Chatani | G06F 17/30899 705/14.46 |
| 7,180,917 | B1 * | 2/2007 | Marko et al. | 370/535 |
| 7,451,177 | B1 * | 11/2008 | Johnson | H04N 21/4825 709/231 |
| 7,533,182 | B2 * | 5/2009 | Wurtzel | H04N 7/173 709/231 |
| 7,617,508 | B2 * | 11/2009 | Gray et al. | 725/13 |
| 7,620,967 | B2 * | 11/2009 | Farineau | 725/46 |
| 8,135,646 | B2 * | 3/2012 | Matsufune | G06Q 30/02 380/201 |
| 2002/0077988 | A1 * | 6/2002 | Sasaki et al. | 705/59 |
| 2002/0100043 | A1 * | 7/2002 | Lowthert et al. | 725/36 |
| 2002/0183059 | A1 * | 12/2002 | Noreen et al. | 455/427 |
| 2003/0172376 | A1 * | 9/2003 | Coffin, III | 725/22 |
| 2004/0031046 | A1 | 2/2004 | Weinblatt et al. | |
| 2004/0143497 | A1 * | 7/2004 | Hayashi et al. | 705/14 |
| 2004/0230993 | A1 | 11/2004 | Weinblatt et al. | |
| 2005/0197903 | A1 * | 9/2005 | Hoffman et al. | 705/14 |
| 2006/0013556 | A1 * | 1/2006 | Poslinski | 386/46 |
| 2006/0206580 | A1 * | 9/2006 | Johnson, III | H04N 7/17318 709/217 |
| 2006/0294547 | A1 * | 12/2006 | Bon et al. | 725/46 |
| 2007/0207780 | A1 * | 9/2007 | McLean | 455/414.1 |
| 2008/0039049 | A1 * | 2/2008 | Park | 455/406 |

* cited by examiner

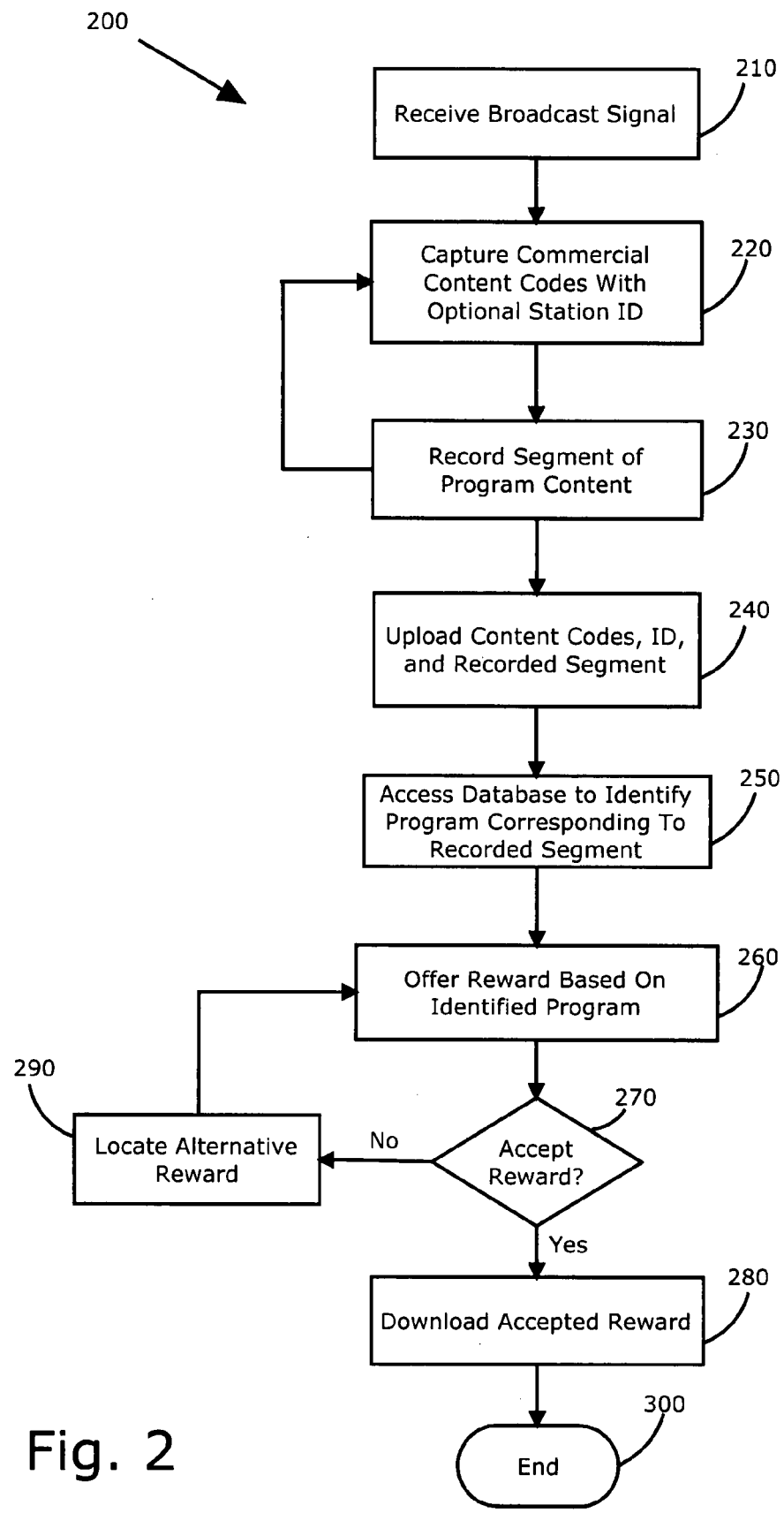

SYSTEM AND METHOD FOR PROVIDING INCENTIVE REWARDS TO AN AUDIENCE TUNED TO A BROADCAST SIGNAL

CROSS REFERENCE TO RELATED CASES

This application claims priority to, and the benefit of, Provisional U.S. Patent Application Ser. No. 60/799,575, filed May 10, 2006, the entirety of which is hereby incorporated herein by reference.

FIELD OF THE INVENTION

This invention is directed to a technique for offering rewards to members of an audience who are tuned to a program broadcast from a program signal source as it is being performed by reproduction equipment. More particularly, with such reward acting as an incentive, the invention seeks to stimulate audience members to capture data which is useful for verifying that advertisements are actually broadcast in accordance with an arrangement agreed upon between the advertiser and broadcaster.

BACKGROUND OF THE INVENTION

The term "program content" as used herein refers to the material that attracts an audience to a particular broadcast station. For example, a television audience will tune in to a particular station in order to watch a certain television program. In the context of radio, program content refers to songs, dialog, such as in the case of "talk" radio, or comedy segments that are played on a radio station.

The terms "advertising content" and "commercial content" which are used interchangeably herein, refer to advertisements (also known as commercials) that are interspersed within the program content, e.g., advertisements that are broadcast between songs in radio program content.

The term "broadcast signal" refers to a signal that contains program content and advertising content.

The "broadcast" of a broadcast signal can be over the airwaves, cable, satellite or any other signal transmission medium. It can also include the time-delayed playback of a broadcast program that was recorded. An "audience" for a broadcast signal is constituted of the persons who perceive it, such as a listener to a radio program.

The broadcast signal is "performed" by any reproduction equipment which results in some form that is perceivable to human beings, namely an audio and/or video signal. The "reproduction equipment" is any and all types of units to convert a broadcast signal into human perceptible form, such as a radio or television tuner and associated components.

The audience can be described as being "tuned" to a specific broadcast signal source, such as a radio broadcast station. The word "tuned" is applied herein to all situations in which a person chooses to be an audience member of program content broadcast by that specific broadcast signal source, such as by twisting a dial or operating a remote control device of a tuner, for example, in order to set that tuner so that it can receive and play the broadcast signal.

The price charged by a broadcaster for broadcasting an advertisement depends on a number of factors. For example, the price can depend on when an advertisement is aired ("aired" is used interchangeably herein with "broadcast"). As an example, a radio advertisement aired during prime commuting times, e.g. "rush hour", will cost more than an advertisement broadcast late at night or at other times which typically have fewer listeners. Also, in many instances an advertiser will pay a radio station to have a specific advertisement aired a number of times per day. For example, an advertiser may contract with a radio station for an advertisement to air three times per day on consecutive days of a week, with the advertisements scheduled for broadcast once during the morning rush hour, once during the evening rush hour, and a third time during the afternoon.

Because advertising rates are dependent on the advertisement broadcast times and the frequency of broadcast (i.e. number of times the advertisement is broadcast), advertisers depend on monitoring data to confirm that the advertisements were in fact aired according to the contracted terms made by agreement with the broadcaster. For obvious reasons, advertisers desire independent, third-party confirmation of such information and do not want to rely on broadcasters to provide it.

When monitoring television programming for advertisements, an identification code, such as a "water mark" which is undetectable by a viewer, is oftentimes embedded in each advertisement included in the advertising content. Detection devices are provided by monitoring services to those audience members who choose to be participants in this effort. The devices are positioned proximate to, or in communication with, the televisions and detect the identification codes from the advertising content when an advertisement is aired. The detected code data is then transmitted or otherwise conveyed to an independent monitoring service. Such a system is more fully disclosed in U.S. patent application Ser. Nos. 10/391,907, 10/080,949 and 10/779,506, the content of all of which are hereby incorporated by reference.

In radio, broadcast signals can also include identification codes for some or all of the advertisements contained in the broadcast signal, along with identification codes which identify the radio station. Thus, a monitoring device can be used to detect codes from a radio broadcast signal which identify an advertisement as well as the station that is playing the advertisement.

Unlike television program content which is predominantly viewed in the home, the vast majority of radio listening occurs outside of the home such as in automobiles and in places of employment. As a result, more meaningful monitoring of radio program content to obtain information of advertising broadcast time, station identification and frequency of advertisements in the advertising content is accomplished through the use of portable monitoring devices which can be carried by participants as they move, for example, among the home, the car, and the place of employment. Such devices may be, for example, a data capture device such as a memory stick, smartcard or other portable type of memory unit. The participant can removably connect such a data capture device to a docking station, for example, connected to a car radio and/or an office radio, so that the device will capture identification codes from the broadcast signal. Once a preset amount of data is captured or a preset time of day is reached, the data on the capture device will be transmitted to a monitoring service for processing. Such a monitoring system depends on cooperation of the monitoring participants to obtain accurate and timely capture and uploading of the needed data to monitor the broadcasting of particular advertisements which are of interest.

In order to stimulate monitoring cooperation by monitoring participants, compensation is typically provided. The compensation can be in various forms such as a monetary payment depending on the length of time of participation, e.g., a certain amount of money per day, etc., or giving specific goods and/or services, or discounts for the purchase of such goods or services. When a reward is offered to a person in exchange for some action by that person, the person's level of interest in obtaining the reward is proportional to the amount of time between the action and getting the reward. The highest level of interest is achieved when the reward is given promptly after the action. Such an "immediate" reward may include printed coupons as discussed in U.S. patent application Ser. Nos. 10/080,949 and 10/391,907.

Although such rewards have been found to be effective in achieving the desired results, it is thought that still greater cooperation would be obtained if a different type of reward were to be offered to participants for the effort involved in the transport, manipulation of capturing devices used in connection with monitoring advertising content in radio programming, and for the uploading of the captured data to a remote data processing center in a timely manner.

SUMMARY OF THE INVENTION

It is an object of the present invention to provide an incentive technique for offering rewards to members of an audience who are listening to a program broadcast from a program signal source as it is being performed by reproduction equipment.

Another object of the present invention is to stimulate such audience members to capture data which is useful for verifying that advertisements are actually broadcast in accordance with an arrangement agreed upon between the advertiser and broadcaster.

These and other objects are obtained in accordance with one aspect of the invention directed to a method for offering a reward to an audience member tuned to a broadcast signal which is performed by reproduction equipment, the broadcast signal having commercial content, program content, and commercial content identification codes respectively corresponding to advertisements contained in the commercial content. The method comprises capturing the commercial content identification codes from the performed broadcast signal, and storing a segment of a program content from the performed broadcast signal in response to a command from an audience member tuned thereto. The program is identified based on the segment thereof that was stored in response to the command, and the audience member is offered a reward related to the identified program.

Another aspect of the invention is directed to an apparatus for offering a reward to an audience member tuned to a broadcast signal which is performed by reproduction equipment, the broadcast signal having commercial content, program content, and commercial content identification codes respectively corresponding to advertisements contained in the commercial content. The apparatus comprises means for capturing the commercial content identification codes from the performed broadcast signal, means for storing a segment of a program content from the performed broadcast signal in response to a command from an audience member tuned thereto, means for identifying the program based on the segment thereof that was stored in response to the command, and means for offering the audience member a reward related to the identified program.

Another aspect of the invention is directed to a method for offering a reward to an audience member tuned to a broadcast signal which is performed by reproduction equipment, the broadcast signal having commercial content, program content, and commercial content identification codes respectively corresponding to advertisements contained in the commercial content, wherein the audience member captures the commercial content identification codes from the performed broadcast signal and actuates storing of a segment of a program content from the performed broadcast signal. The method comprises identifying the program based on the segment thereof that was stored in response to the command, and offering the audience member a reward related to the identified program.

Another aspect of the invention is directed to apparatus for offering a reward to an audience member tuned to a broadcast signal which is performed by reproduction equipment, the broadcast signal having commercial content, program content, and commercial content identification codes respectively corresponding to advertisements contained in the commercial content, wherein the audience member captures the commercial content identification codes from the performed broadcast signal and actuates storing of a segment of a program content from the performed broadcast signal, wherein the apparatus comprises means for identifying a program based on the segment thereof that was stored in response to the command, and means for offering the audience member a reward related to the identified program.

BRIEF DESCRIPTION OF THE DRAWINGS

FIG. 2 is a flow chart showing steps performed by a method in accordance with an embodiment of the invention.

DETAILED DESCRIPTION OF THE DRAWINGS

Figure 1:
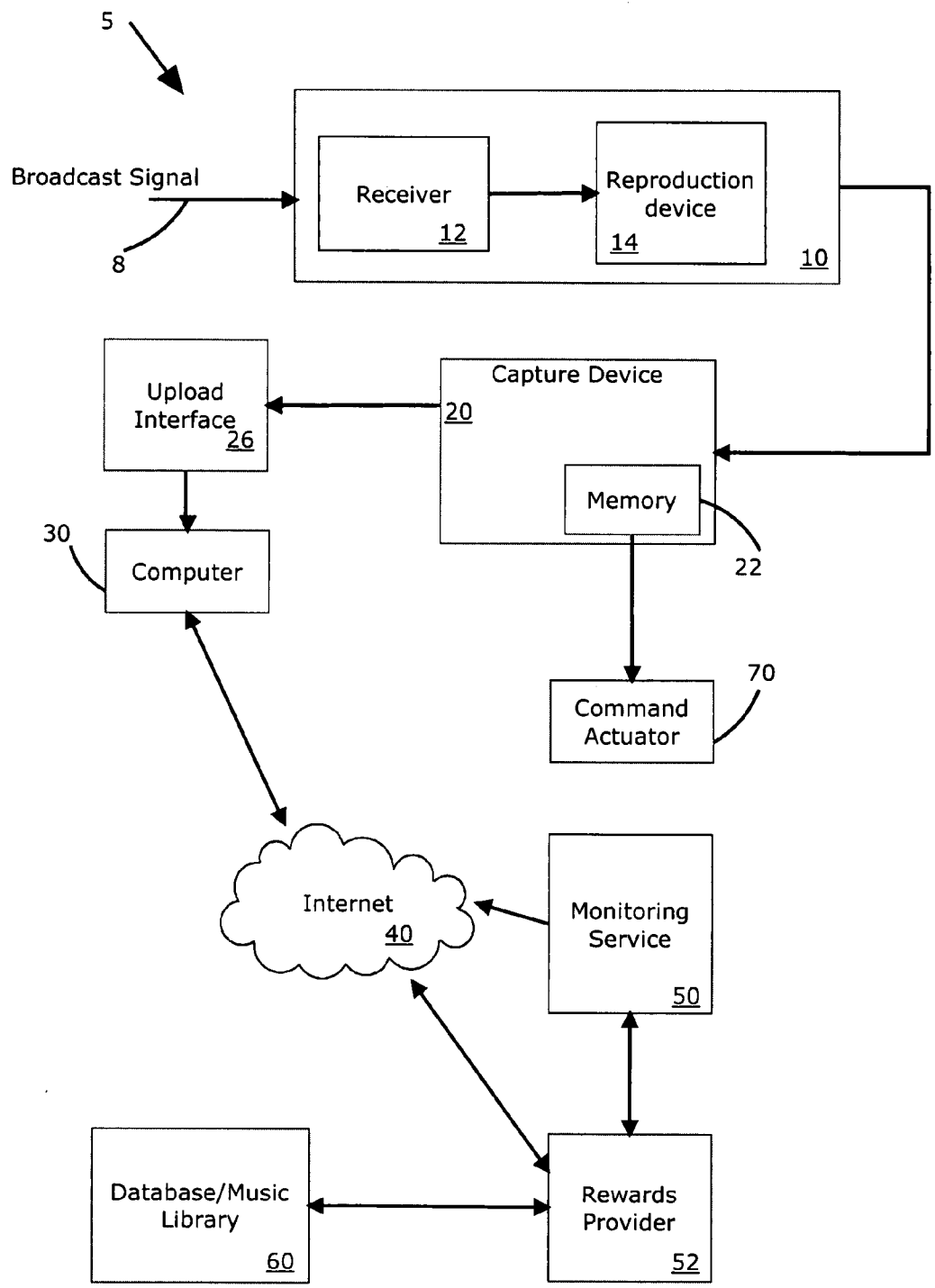
FIG. 1 is a schematic block diagram depicting a system in accordance with an embodiment of the invention.

The invention is directed to a system and method for providing incentives to audience members of broadcast signals to assist in the gathering of data pertaining to commercial content contained in the broadcast signals. For broadcast programming, whether for television or radio, a broadcast signal will include program content and commercial content. Television program content is made up of performances such as presented in television shows, movies, sporting events, etc., while commercial content refers to the advertisements that are interspersed within the television program content.

In radio, the program content can be music on one type of radio program while the content in other types of radio programs includes comedy routines, audio books, and dialog. Radio commercial content includes radio commercials that are interspersed with the radio program content. Radio stations are known for a particular "format" and the content aired on that radio station is tailored to that format. Thus, a radio station having a country music format will play country music songs whereas a radio station having a "top 40" format will play songs which are currently popular.

Although the invention is applicable to monitoring advertisements regardless of how broadcast, e.g., for television and radio, the detailed description that follows is restricted to radio broadcasts, for purposes of clarity and conciseness.

Radio advertisers will pay to have a particular advertisement broadcast or "aired" on a particular radio station during specific times of the programming day and/or at a certain frequency (e.g. number of times per day). Radio advertisers are interested in verifying whether an advertisement has been aired according to the terms of the advertiser's agreement with the radio station. To assist in the verification process, identification code signals which correspond to or identify a particular advertisement are embedded into the advertisement signal or generated as a supplementary code signal which is broadcast with the advertisement. The detection of these codes allows an advertisement to be identified when an advertisement is broadcast. It is also common to include a station identification code signal in the broadcast signal which can be used to identify the radio station that played the advertisement. Although radio stations can and sometimes do provide advertisers with a log identifying the content contained in its broadcast signal and/or the times and frequency that an advertisement has been broadcast, advertisers prefer to rely on third parties for independent verification of the data in the radio station log, i.e. the times and frequency of advertisement play. In addition to verifying the times and frequency of the broadcast of advertisements, advertisers also want to determine the audience size and demographics so they can ascertain whether the advertisements are being heard by a desired demographic and size of an audience.

One technique used by third party monitoring services to independently monitor radio advertisement activity for the purpose of providing advertisers with data concerning the air times and frequency of advertisements is to assign monitoring devices to a number of participants representing a particular demographic and audience size. The participants are people (referred to herein interchangeably as audience members, participants, listeners and users) who will listen to radio broadcasting and use the capture devices so that the devices will capture advertisements, as well as the identification codes for identifying the radio station playing the advertisements. An indication of the time when such advertisements are broadcast can be provided by a time signal embedded in the broadcast signal or by a clock included in the monitoring device. Such a monitoring device can be in the form of a memory stick or smartcard which has an interface or "docking" station for connecting to a radio tuner, as is known in the art, or may, alternatively, have a wireless receiver for detecting the identification codes from a reproduced radio broadcast signal. The monitoring device can be any type of portable storage device for detecting and storing (i.e. capturing) the identification codes from a radio broadcast signal. For simplicity, the term "capture device" is used herein.

Because radio audiences can be made up of listeners away from home, e.g. listeners traveling in automobiles and sitting at work, the car radios and office radios of participants may include a docking station for interfacing with the capture device. For example, when a monitoring participant enters his automobile, he simply inserts the capture device into the docking station of the automobile radio so that, as the radio is played, the capture device will capture the advertising and radio station identification codes from the broadcast signal. Preferably, this occurs only when the broadcast signal is played at a volume level which is audible to a listener. The docking station may also include a radio activation switch which will be automatically activated when the capture device is properly seated therein. In this manner, the radio will only work when the capture device is being used, thus stimulating cooperation from the monitoring participant.

When the monitoring participant arrives at work, the capture device will be removed from the docking station installed in the automobile and inserted into another docking station connected to or in communication with a radio at the monitoring participant's place of work. Then, when the monitoring participant leaves his place of work, such as during lunch or at the end of the day, the capture device will again be removed and re-inserted into the user's car radio docking station for further capture of advertising and identification codes. Of course, if the capture device is a self-contained portable unit capable of reproducing the radio content and detecting/storing the identification codes, then this obviates the need to have the above-described docking stations.

Once the identification code data is captured by the capture device, the data must be conveyed to a monitoring service for processing. This can be accomplished by removal of the capture device from, for example, the car radio docking station, and connecting the capture device to a communication device for transmitting or "uploading" the captured data to the monitoring service. The uploading can be accomplished using various techniques. For example, the capture device can be connected to a telephone interface for transmitting the captured data. Alternatively, and preferably, the capture device can be connected to a reader interfaced with a computer having Internet access.

The term "computer" is used herein in its broadest sense and can be any type of user device having electronic data processing capability, such as a PC, a PDA, a mobile phone or any other type of electronic communication device capable of receiving data and uploading it to a remote location. In the case of a mobile phone, the capture device can even constitute a component of the mobile phone and the captured data can be uploaded via a wireless Internet access technique as is known by those of ordinary skill in the art. For simplicity, use of the invention will be described in connection with a computer that can access, via the Internet, a website of the monitoring service and upload the data from the capture device to the monitoring service.

Turning now to FIG. 1, a system 5 for capturing advertisement data from a broadcast signal 8 including program content and advertising content is depicted. The system 5 includes a receiving device 10 which receives the broadcast signal 8. The receiving device 10 is a radio including a broadcast signal receiver or "tuner" 12 and a reproduction device 14 such as an audio amplifier with one or more speakers. Although the broadcast signal receiver 12 and the reproduction device 14 are depicted as separate components, this is for illustrative purposes only and those skilled in the art will recognize that these separate components can be a single component having a power amplifier, tuner and speakers. Likewise, the receiving device can be a portable listening device wherein the speakers are in the form of headphones worn by the listener.

Advertising content in the broadcast signal is made up of a plurality of advertisements that are interspersed within the program content. Some or all of the advertisements will include an embedded identification code signal that is not perceptible to the audience member of the reproduced broadcast signal but is detectable by the capture device 20. The identification code is a code that is typically unique to an advertisement so that one advertisement can be distinguished from another by their respective codes. As mentioned above, the capture device 20 can be a smartcard, memory stick or any portable device which, when positioned within a range of an audible reproduced broadcast signal, can detect and capture the advertisement identification codes therefrom.

In one embodiment, the capture device 20 includes a clock (not shown) to record the time that the advertising content codes are captured, thereby indicating the time when an advertisement corresponding to the captured code was played. The capture device 20 may be interfaced with the receiving device 10, such as with a wired connection or, with a wireless capability, by simply placing the capture device in an environment in which the broadcast signal can be heard by a listener. Regardless of how the advertising content codes are received, the purpose is to capture data outputted from receiving device 10 and forward it to a monitoring service 50 for use in determining that (1) a specific advertisement was aired, (2) on a specific station, and possibly also (3) at what specific time.

Once the data, i.e. the advertising content codes, are captured by device 20, the data must be uploaded to the monitoring service 50. This is accomplished by transmitting the data, for example, via the Internet, to a website of the monitoring service. In the case of the device 20 being configured as a memory stick, the memory stick will be removed from a listener's automobile and connected to a data upload interface 26 connected to a user's computer 30. The interface 26 may be a card reader or other peripheral device connected to a USB port capable of reading data contained on the capture device 20 and forwarding it to the monitoring service 50. Likewise, a Bluetooth connection can be provided between the interface 26 and computer 30, or between the capture device 20 and the computer 30. The computer will then convey the advertising content code and an identification code for identifying the radio station on which the advertisement was played and, if available, any time stamp coding, through the Internet 40 to the monitoring service 50 for data analysis.

In addition to the device 20 for capturing the advertising content codes, the arrangement includes in accordance with the contemplated embodiments a memory 22 and a record feature which allows a portion or segment of the program content that is being played by the radio to be stored in the memory. For example, memory 22 can include a portion functioning as a FIFO type of memory that always stores the previous 10-second snippet of the broadcast signal. Memory 22 can also include a permanent memory into which the data in the FIFO memory can be selectively transferred, or recorded, upon actuation.

In one embodiment, the record feature is performed in response to the output from a command actuator 70 responsive to a command from the user, e.g. a listener of the radio broadcast signal using capture device 20. For example, if the program content is a song that appeals to the listener, the listener will generate a "record" command, either verbally or by actuating a function button or the like on the device 20 during a broadcast of the song. When the record command is generated, command actuator 70 will respond to such command by cause device 20 to record whatever segment of the song that is aired at that time and store in the FIFO portion of memory 22.

It is contemplated that a substantial use of the system 5 will be in connection with monitoring radio advertisements from a car radio. Therefore, it is preferred that the "record" command be capable of being executed in a hands-free mode such as by the user saying "record" or another verbal command when a segment of a particular song is to be recorded. Alternatively, a record button can be placed on the steering wheel so that the driver can access the button while maintaining his hands on the steering wheel.

When the device 20 is disconnected or otherwise removed from the monitoring radio (e.g. a car radio, office radio, etc.) and connected to the data upload interface 26 for uploading the advertising content codes to the monitoring service, the song segment will also be uploaded. Thereafter, a reward based on the uploaded song will be offered to the user. In this regard, the song segment will be forwarded to a rewards provider 52 either via the Internet or through a direct wired or wireless communication link. The rewards provider will contact a program content database populated with different categories of program content and, in particular, with songs of different genres, recorded comedy routines, dialog, audio books, etc. A comparison of the uploaded song segment to the database content, such as by well known pattern recognition techniques for example, will be performed by rewards provider 52 to identify the song. Once the song is identified, an electronic version of the song, or an Internet URL link for use in obtaining an electronic version of the song, will be provided to the user's computer 30 via the Internet 40. In this manner, a reward in the form of the song that the user had expressed an interest in obtaining—as judged from the act of causing a segment of the song to be recorded on the device 20—will be provided to the user. This occurs without the user requiring knowledge of the title of the song or of the artist performing the song. This reward provides an incentive for the user to use capture device 20 as much as possible and to cause the captured data in the device 20 to be uploaded in a timely manner so that the user can obtain the reward, namely the desired song.

The database music library 60 can be a library owned or operated by the rewards provider 52. It is preferred, however, that the music library be affiliated with or otherwise operated by a music subscription service such as iTunes®, Napster®, and others, which have thousands of songs available to consumers for download upon payment of a fee. The rewards provider 52 can access the music library 60 via the Internet or via a private connection link which may be wired or wireless.

A high speed algorithm as is known in the art can be used to access the music library 60 for the purpose of comparing the recorded song segment to the contents of the music library 60 in order to identify the song from the stored song segment. The identification process can be expedited with knowledge of the radio station identification code. For example, if the radio station is identified by its code as a classical station, a classical music category of songs will be searched in order to identify the song from the captured segment. Likewise, if a country station code is present in the captured segment, a country song category will be searched.

If more than one song is identified from the high speed algorithm, the user can select which one of the songs is desired. It is contemplated that the reward offered to the user be limited to one song per day. This limitation is solely a design choice and can be implemented in numerous ways. For example, the memory 22 in the capture device 20 can be designed to hold only a single segment of a song and the system 5 will provide the reward to the user in the form of the entire song. If, during a monitoring day, a user desires a different song other than the song corresponding to the segment that was recorded earlier, the user will initiate another record request (either verbally or by pushing a button) which will cause the device 20 to replace the previously-stored song segment with a new one. Then, when the record/capture device 20 is placed in communication with the monitoring service 50, only the then-existing song segment stored in memory 22 will be compared to the contents of the music library 60 to identify the song corresponding to the stored segment.

As an alternative to storing a single song segment, the memory 22 of the capture device 20 may be capable of storing a plurality of song segments and, upon uploading of the data stored in the capture device 20, all songs corresponding to the recorded song segments will be identified to the user. The system of rewards provider 52 can then apply guidelines to control whether the user receives one reward or more rewards from among the identified songs, and can allow the user to select from the list of identified songs.

As a further alternative, the system may only afford the user a single song per day. Thus, if a user records segments for three songs on a first day, and none on a second day, the user can select a reward from the songs corresponding to the song segments that were present from a prior day.

It should be appreciated that the present invention also provides an easy way for the music library 60 to recommend certain music or other content to a user based on the stored song segment(s). For example, upon looking up the song in the music database from a captured song segment, other songs from the recording artist corresponding to the identified song can be suggested by rewards provider 52 to the user for purchase. Likewise, similar artists in the same genre of the artist corresponding to the reward song can be recommended to the user.

A method 200 for practicing an embodiment of the present invention is depicted in the flow chart of FIG. 2. The method begins with the receiving of a broadcast signal 8 in step 210. From the reproduced broadcast signal 8, the commercial content identification codes and, optionally, a station identification code is captured (step 220). A segment of the program content is then selectively recorded, per step 230, such as when command actuator 70 in capture device 20 of FIG. 1 is activated by command 70 (FIG. 1), as explained above.

After capture of the content codes, the codes along with the station identification codes (if available) and one or more recorded segments of program content, if any were recorded, is uploaded to a monitoring service 50 (step 240). A database, such as music library 60 in FIG. 1, is then accessed via rewards provider 52 (FIG. 1) to identify the songs respectively corresponding to the recorded segments of program content (step 250). Once the songs are identified, a reward is offered to the user based on the identified songs (step 260). The listener is then given the opportunity to accept the reward (step 270) whereupon the listener can simply use computer 30 (FIG. 1) to click on a URL link to access and download the one or more identified songs to, e.g., a computer, portable music player, or the like.

If the listener does not accept the offered reward, the system 200 will locate an alternative reward in step 290, such as a song recorded on a previous day but not selected for download, another song by the music artist corresponding to the first offered song reward, or other songs in the same genre of the first offered song reward, so that the user can accept a reward from among other songs offered by the method 200. Once a reward is accepted, a download of the accepted reward occurs in step 280. Thereafter, the method ends in step 300 which, effectively, ends the "session" of the data upload and reward download. Thereafter, the audience member can remove the capture device 20 from the upload interface 26 or otherwise cease communication between them and, again, interface the capture device with the receiver device 10 to capture a new session of commercial content codes.

While there have been shown and described novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/ or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A method for offering a reward to an audience member tuned to a broadcast signal which is performed by reproduction equipment, the broadcast signal having commercial content, program content, and commercial content identification codes corresponding to respective advertisements contained in the commercial content, the method comprising:

capturing the commercial content identification codes from the performed broadcast signal by a portable capture device, the portable capture device being at a location of an audience member tuned to the broadcast signal, the performed broadcast signal comprising at least one of reproduced audio and video;

receiving a command by the portable capture device to store an audio and/or video segment of the broadcast program content from the at least one of the reproduced audio and video of the performed broadcast signal from the audience member;

storing the audio and/or video segment of the performed broadcast program content by the portable capture device in response to the command;

uploading the stored audio and/or video segment of the broadcast program content by the portable capture device to a monitoring service at a location remote to the portable capture device, via a network;

identifying the program content based on the uploaded audio and/or video segment, by the monitoring service; and offering the audience member a reward based on the identified program content.

2. The method of claim 1, wherein the broadcast signal comprises an identification code for identifying a source that is broadcasting the broadcast signal, and wherein said capturing step further comprises capturing the source identification code by the portable capture device.

3. The method of claim 1, wherein said storing step comprises storing the audio and/or video segment in memory of the portable capture device.

4. The method of claim 1, wherein said storing step further comprises storing the time corresponding to when commercial content corresponding to a captured identification code was broadcast.

5. The method of claim 1, wherein said identifying step further comprises accessing a database and comparing the uploaded audio and/or video segment of broadcast program content to contents of the database to identify the program corresponding to the uploaded audio and/or video segment of program content, by the monitoring service.

6. The method of claim 1, wherein said offering step comprises enabling access by the audience member to said identified program.

7. The method of claim 6, wherein the identified radio program comprises one of music, dialog, spoken comedy, and audio book.

8. The method of claim 1, wherein said identified program is a radio program.

9. The method of claim 8, wherein said capturing step is carried out when the radio program is performed at a volume level that is audible to the audience member.

10. The method of claim 8, wherein said storing step further comprises the step of storing a plurality of audio and/or video segments of broadcast program content from the performed radio broadcast signal.

11. The method of claim 1, wherein said offering step comprises enabling access by the audience member to another program by an artist of the identified program.

12. The method of claim 1, wherein said offering step comprises enabling access by the audience member to another program having a genre common with a genre of the identified program.

13. The method of claim 1, further comprising uploading the captured identification codes and the stored audio and/or video segment of program content to the monitoring service via the Internet.

14. The method of claim 1, further comprising the steps of receiving a reward acceptance from the audience member and then providing the audience member with access to the accepted reward.

15. The method of claim 1, wherein the command is a manually actuated command.

16. The method of claim 1, wherein the command is a verbal command.

17. Apparatus for offering a reward to an audience member tuned to a broadcast signal which is performed by reproduction equipment, the broadcast signal having commercial content, program content, and commercial content identification codes corresponding to respective advertisements contained in the commercial content, the apparatus comprising:
  means for capturing the commercial content identification codes from the performed broadcast signal, the performed broadcast signal comprising at least one of reproduced audio and video, the means for capturing being at a location of an audience member tuned to the broadcast signal;
  means for receiving a command to store an audio and/or video segment of the broadcast program content from the at least one of the reproduced audio and video of the performed broadcast signal in response to a command from the audience member;
  means for storing the audio and/or video segment of the broadcast program content, in response to the command, at the location of the audience member;
  means for receiving the stored audio and/or video segment of the broadcast program content via a network and identifying the program content based on the received audio and/or video segment thereof that was stored in response to the command, at a location remote from the location of the audience member; and
  means for offering the audience member a reward based on the identified program content.

18. The apparatus of claim 17, wherein the broadcast signal comprises an identification code for identifying a source that is broadcasting the broadcast signal, and wherein said means for capturing captures the source identification code.

19. The apparatus of claim 17, wherein said means for capturing comprises a portable capture device.

20. The apparatus of claim 19, wherein said means for storing stores the audio and/or video segment of the broadcast program content in memory of the portable capture device.

21. The apparatus of claim 17, further comprising a clock, and wherein said means for storing stores the time corresponding to when commercial content corresponding to a captured identification code was broadcast.

22. The apparatus of claim 17, wherein said means for identifying comprises means for accessing a database and comparing the received audio and/or video segment of the broadcast program content to contents of the database to identify the program corresponding to the stored audio and/or video segment of program content.

23. The apparatus of claim 17, wherein said means for offering enables access by the audience member to said identified program.

24. The apparatus of claim 17, wherein said identified program is a radio program.

25. The apparatus of claim 24, wherein the identified radio program comprises one of music, dialog, spoken comedy, and audio book.

26. The apparatus of claim 24, wherein said means for storing stores a plurality of audio and/or video segments of broadcast program content from the performed radio broadcast signal.

27. The apparatus of claim 24, wherein said means for capturing captures the commercial content identification codes from the performed broadcast signal when the radio program is performed at a volume level that is audible to the audience member.

28. The apparatus of claim 17, wherein said means for offering enables access by the audience member to another program by an artist of the identified program.

29. The apparatus of claim 17, wherein said means for offering enables access by the audience member to another program having a genre common with a genre of the identified program.

30. The apparatus of claim 17, further comprising means for uploading the captured identification codes and the stored audio and/or video segment of broadcast program content to a monitoring service via the Internet.

31. The apparatus of claim 17, further comprising means for receiving a reward acceptance from the audience member and then providing the audience member with access to the accepted reward.

32. The apparatus of claim 17, further comprising means for manually actuating the command by the audience member.

33. The apparatus of claim 17, further comprising means for verbally actuating the command by the audience member.

34. A method for offering a reward to an audience member tuned to a broadcast signal which is performed by reproduction equipment, the broadcast signal having commercial content, program content, and commercial content identification codes corresponding to respective advertisements contained in the commercial content, the performed broadcast signal comprising at least one of reproduced audio and video, wherein the audience member captures the commercial content identification codes from the at least one of the reproduced audio and video of the performed broadcast signal and actuates storing of an audio and/or video segment of the broadcast program content from the performed broadcast signal, the method comprising:
  receiving the segment of the broadcast program content stored by the audience audio and/or video member at a location remote of the audience member, via a network;
  identifying the received program content based on the received audio and/or video segment of the broadcast program content; and
  offering the audience member a reward based on the identified program content.

35. The method of claim 34, wherein said identifying step further comprises accessing a database and comparing the uploaded audio and/or video segment of broadcast program content to contents of the database to identify the program content corresponding to the uploaded audio and/or video segment of broadcast program content.

36. The method of claim 34, wherein said offering step comprises enabling access by the audience member to said identified program.

37. The method of claim 34, wherein said identified program is a radio program.

38. The method of claim 37, wherein the identified radio program comprises one of music, dialog, spoken comedy, and audio book.

39. The method of claim 34, wherein said offering step comprises enabling access by the audience member to another program by an artist of the identified program.

40. The method of claim 34, wherein said offering step comprises enabling access by the audience member to another program having a genre common with a genre of the identified program.

41. The method of claim 34, further comprising the steps of receiving a reward acceptance from the audience member and then providing the audience member with access to the accepted reward.

42. Apparatus for offering a reward to an audience member tuned to a broadcast signal which is performed by reproduction equipment, the broadcast signal having commercial content, program content, and commercial content identification codes corresponding to respective advertisements contained in the commercial content, the performed broadcast signal comprising at least one of reproduced audio and video, wherein the audience member captures the commercial content identification codes from the at least one of the reproduced audio and video of the performed broadcast signal and actuates storing of an audio and/or video segment of the broadcast program content from the performed broadcast signal, the apparatus comprising:

means for receiving the audio and/or video segment of the broadcast program content stored by the audience member at a location remote of the audience member, via a network;

means for identifying the program content based on the received audio and/or video segment of the broadcast program content; and means for offering the audience member a reward based on the identified program content.

43. The apparatus of claim 42, wherein said identifying means further comprises means for accessing a database and comparing the uploaded audio and/or video segment of broadcast program content to contents of the database to identify the program corresponding to the uploaded audio and/or video segment of broadcast program content.

44. The apparatus of claim 42, wherein said offering means enables access by the audience member to said identified program.

45. The apparatus of claim 42, wherein said identified program is a radio program.

46. The apparatus of claim 45, wherein the identified radio program comprises one of music, dialog, spoken comedy, and audio book.

47. The apparatus of claim 42, wherein said offering step comprises enabling access by the audience member to another program by an artist of the identified program.

48. The apparatus of claim 42, wherein said offering means enables access by the audience member to another program having a genre common with a genre of the identified program.

49. The apparatus of claim 42, further comprising means for receiving a reward acceptance from the audience member and then providing the audience member with access to the accepted reward.

\* \* \* \* \*